United States Patent [19]
Thomas

[11] Patent Number: 5,964,412
[45] Date of Patent: Oct. 12, 1999

[54] GARDEN WATERING SYSTEM

[75] Inventor: Jeffrey A. Thomas, McMinnville, Oreg.

[73] Assignee: Coil Solutions, Inc., McMinnville, Oreg.

[21] Appl. No.: 08/926,138

[22] Filed: Sep. 9, 1997

[51] Int. Cl.⁶ .................................................... B05B 9/01
[52] U.S. Cl. ........................................... 239/195; 239/525
[58] Field of Search ..................... 239/152, 154, 239/195, 525, 530, 532; 138/119; 137/355.23, 355.16

[56] References Cited

U.S. PATENT DOCUMENTS

| | | | |
|---|---|---|---|
| 4,412,656 | 11/1983 | Beck | 239/532 X |
| 4,621,770 | 11/1986 | Sayen | 239/304 |
| 5,344,075 | 9/1994 | Springer et al. | 239/70 |

OTHER PUBLICATIONS

Freelin–Wade Company, Plastic Tubing Catalogue, 1730 Miller Street, McMinnville, Oregon, (noted Mar. 1996).

*Primary Examiner*—Lesley D. Morris
*Attorney, Agent, or Firm*—Dickinson Wright PLLC

[57] ABSTRACT

A garden watering system including an elongate flexible tube formed in extendable and contractible helical coils having opposed ends, with a faucet connector attached to one end of the tube, and a spray nozzle or wand connected to the opposite end of the tube. The coiled tube permits a wide range of extension of the watering system during use.

15 Claims, 1 Drawing Sheet

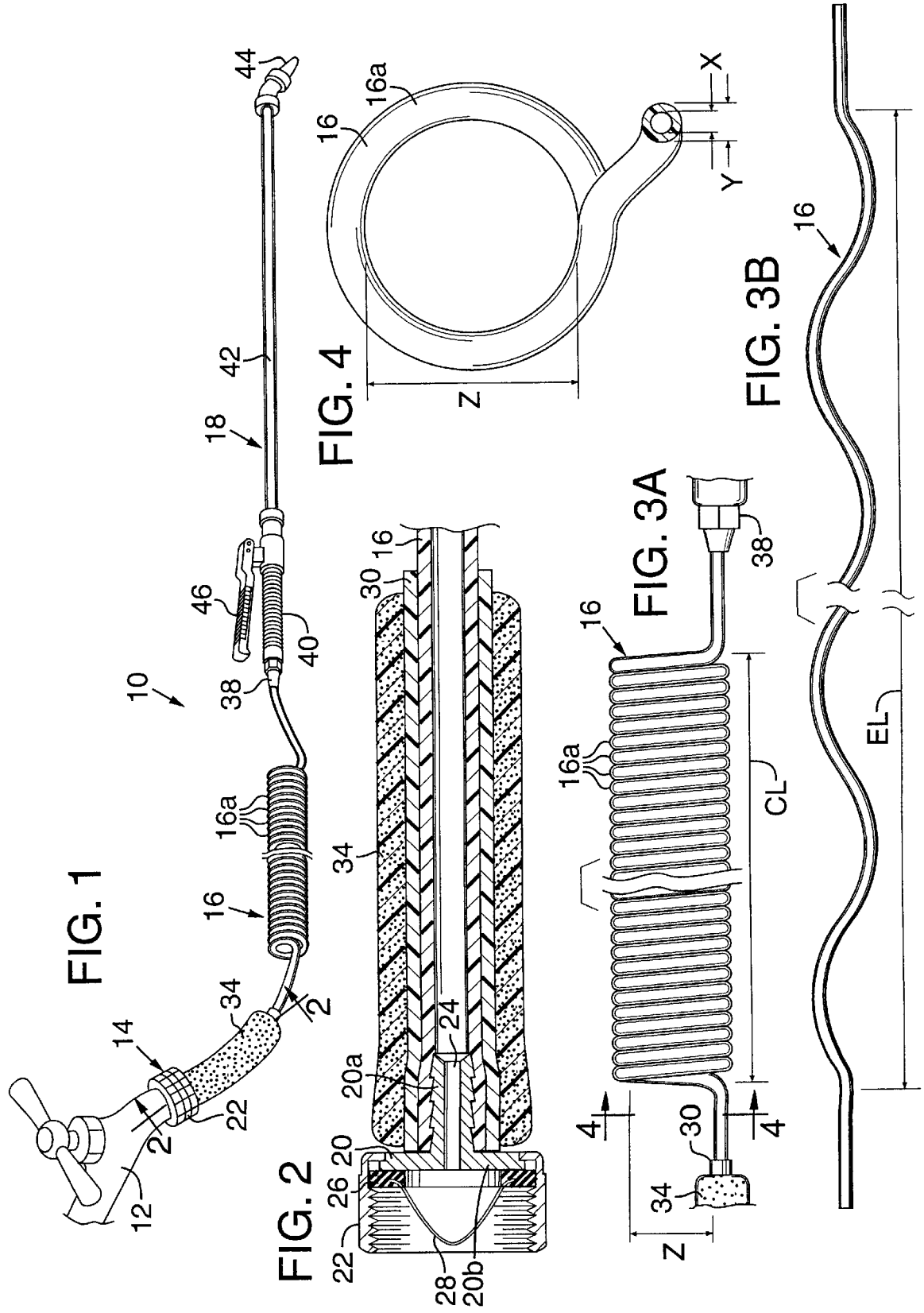

GARDEN WATERING SYSTEM

BACKGROUND OF THE INVENTION

The present invention relates to a garden watering system, and more particularly to a system having an elongate flexible extendable and contractible helically coiled tube permitting a wide range of movement.

In the past, garden watering systems generally have relied on watering cans, permanently mounted sprinkler systems, or hoses of a defined length which had to be physically rolled up or otherwise stored to keep them out of the way when not in use. The permanently mounted systems have been expensive to install and lack the ability to reach new areas.

With prior hoses, a rather large diameter hose (usually having a diameter of ½ to ⅝ inch) is used which provides a large volume of water movement, although often such may not be required for plant watering. Such prior hoses have to be of a full length to reach appropriate parts of a garden, or yard, yet are far larger than necessary and are cumbersome to use and difficult to store.

The use of watering cans and full size hoses has been found to be particularly inconvenient for watering elevated plants, such as hanging baskets, due to the weight of the cans of water, the nozzle systems generally used on hoses, and the weight of water-filled hoses. Users often have been subjected to water running down their arms when attempting to water elevated plants with prior watering devices.

SUMMARY OF THE INVENTION

The present invention overcomes many of the problems of prior watering devices by providing a garden watering system that allows a user to easily and conveniently water plants over a wide garden range. The system includes an elongate flexible tube of smaller diameter than the normal garden hose formed in extendable and contractible helical coils having opposed ends, a faucet connector coupled to one end of the tube, and a spray nozzle coupled to the opposite end of the tube. By providing a small diameter tube which is formed in extendable and contractible helical coils, a watering device is provided which is light weight, automatically contracts for storing, and is sized to provide an appropriate flow of water without demanding the weight and cumbersome qualities of prior watering devices.

More specifically, the present invention utilizes a tube comprised of polyurethane having a durometer hardness measurement in a range of 85–98 Shore A (preferably about 95 Shore A) to provide the needed flexibility and durability for use in such applications.

Further, it has been found advantageous to provide the tube in a size which has an inner diameter in a range of 0.125 to 0.375 inch (preferably about 0.160 inch) and an outer diameter in a range of 0.245 to 0.5625 inch (preferably about 0.245 inch) and forming the helical coils with an inner diameter in a range of 0.5 to 2.5 inches (preferably about one inch). The helical coils are formed so that adjacent coils are pressed against each other when in their contracted position and are capable of being extended manually to a length at least about 14 times the contracted length. This allows the system to be maintained in a compact lightweight contracted condition for storage, yet provides wide range of use throughout a garden upon extension.

Another object of the invention is to provide such a coiled tube watering system which has a connector for connecting it to a standard hose faucet and having a defined bore extending therethrough to permit controlled flow of fluid therethrough to the tube, and a strain relief sleeve surrounding the tube adjacent the hose connector.

Further, the system may have an elongate rigid tube spray wand with an adjustable spray nozzle at the user end of the system to allow watering otherwise difficult to reach regions. The lightweight easily extended flexible tube and the elongate spray wand provide a system that allows the user to conveniently water plants that were difficult to access with prior watering systems.

These and other objects and advantages of the present invention will become more fully apparent as the following description is read in conjunction with the drawings.

BRIEF DESCRIPTION OF THE DRAWINGS

FIG. 1 is a perspective view of a garden watering system according to an embodiment of the invention;

FIG. 2 is an enlarged cross-sectional view taken generally along the line 2—2 in FIG. 1;

FIG. 3A is an enlarged side elevation view of a coiled tube portion of the system in a contracted condition;

FIG. 3B is an illustration similar to 3A, but with the tube in an extended working condition; and FIG. 4 is an enlarged cross-sectional view taken generally along the line 4—4 in FIG. 3A.

DESCRIPTION OF A PREFERRED EMBODIMENT

Referring to FIG. 1, at 10 is indicated generally a garden watering system according to an embodiment of the invention connected to a hose faucet 12. The system 10 includes a faucet connector 14, an elongate flexible tube 16, and an elongate spray nozzle or wand device 18.

Tube 16 in the preferred embodiment is made of flexible polyurethane tubing formed in extendable and contractible helical coils 16*a*.

The tube in the preferred embodiment is comprised of polyurethane having a durometer hardness measurement in a range of between 85 to 98 Shore A (preferably about 95 Shore A) to provide desired recoil memory and good flexibility. As best illustrated in FIG. 4, the tube is extruded to have an inner diameter noted at X. The inner diameter X may be in a range of 0.125 to 0.375 inch (preferably about 0.160 inch). The tube has an outer diameter Y in a range of from 0.245 to 0.5625 inch (preferably about 0.245 inch). Polyurethane of a durometer hardness noted is a hydraulically stable material well suited for water transfer applications and durability.

Referring to FIG. 4 the coils are formed with an inner diameter noted at Z. This inner diameter Z of the coils may range from 0.5 to 2.5 inches (preferably about one inch). The coils are so formed and shaped that when they are in the contracted position illustrated in FIG. 3A adjacent coils are pressed against each other. The coils are pressed together with sufficient force that they retain their contracted position during storage, but the contracting force of the coils is sufficiently light that the normal home gardener may easily extend tube 16 to its working length as seen in FIG. 3B.

The dimensions set out above may be changed slightly, but it has been found that the tubing material specified above and formed in the coil configuration specified (particularly as set out as the preferred configuration and materials) provides an excellent balance between coil memory and coil tension. It has been found that if the coil diameter Z is reduced substantially for this type tubing the tubing may either collapse or the coil tension becomes too great for convenient use. Substantially increasing the diameter Z of the coil can result in reduced coil memory for contraction and tension will decrease to a point where it is unsatisfactory. It is believed that the present design (particularly that set out as the preferred design) optimizes tubing size, coil memory and convenience for the user.

The relationship between the tubing size, coil diameter, contracted length and material length of the product also optimizes the convenience for the user. In FIG. 3A the dimension CL denotes the contracted length of the coiled section of the tubing. In FIG. 3B the EL denotes the extended length of the coil portion of the tubing as manually extended by a user. For the coil formed of the materials set out above and with the dimensions established a one inch longitudinal length of coil in its contracted state will produce approximately 1.3 feet of extended material. A coil having a length CL of 25 inches in its retracted form may be extended to an extended length EL of approximately 32 feet. It has been found that for user convenience the extended length EL should be at least 14 times the contracted length CL. Shorter coils and longer coils of tubing may be used to provide watering systems consistent with user needs, in relation to the size of their gardens and placement of hose faucets within the garden. The faucet connector 14 as best shown in FIG. 2 includes a fitting 20 secured in one end of tube 16 and an internally threaded screw-on coupling 22 rotatably mounted on fitting 20.

Fitting 20 comprises an elongate, substantially cylindrical, externally barbed portion 20a and a disk shaped head 20b secured thereto. A bore 24 extends through the fitting which is smaller than the inner diameter X of tubing 16. Coupling 22 is a screw-on hose coupling rotatably mounted on head 20b. The fitting portion 20a is inserted into an end of tube 16 and held therein by an interference fit, with the barbs inhibiting removal axially of the tube.

An elastomeric washer 26 having a sieve-like strainer 28 secured therein is held within coupling 20 against head 20b.

In assembly an elongate polyurethane sleeve 30 initially is slid onto tube 16 with a substantially tight, yet slidable, fit therebetween. The sleeve is slid axially along tube 16 so that it does not surround the end portion of tube 16 into which the barbed fitting is to be inserted. The barbed fitting then is forcibly inserted axially into the end of the tube. Sleeve 30 then is slid along tube 16 to a position as shown in FIG. 2 to extend about the outer portion of tube 16 surrounding fitting portion 20a. Sleeve 30 tightly confines the end of tube 16 around the barbed coupling fitting to hold it therein.

Secured about sleeve 30 and extending axially from a position adjacent coupling 22 and over a major portion of sleeve 30 is an expanded foam sleeve 34. Sleeve 34 and sleeve 30 together act as a strain relief sleeve tightly surrounding tube 16 in the region of the insert and extending axially of the tube a distance beyond the insert to provide added strength in the region of the hose connection end of the system. Further, the expanded foam sleeve 34 provides a comfortable grip for a user working with this end of the system.

The opposite end portion of tube 16 is coupled through a fitting 38 to elongate spray wand 18. The spray wand has a handle portion 40, an elongate substantially rigid tube 42, and a swivel mounted adjustable spray nozzle 44. An elongate control lever 46 is pivotally mounted on handle 40 and is connected to a valve in the spray wand to control the flow of fluid from tube 16, into the spray wand, and out nozzle 44.

Operation of the device as a garden watering system is very simple and convenient. The hose coupling is screwed onto a hose faucet 12 and the faucet is turned on. A controlled flow of water passes through strainer 28 to prevent particulate matter above a selected size from passing into the tube which otherwise might occlude the spray nozzle. Water flowing through the strainer is controlled in its flow through bore 24 into tubing 16 and upon activation of lever 46 the water will spray out of nozzle 44 in a pattern defined by the user by adjustment of the nozzle. This spray may be either a small diameter heavy stream, a fog-like fan-shaped spray, or any configuration therebetween which is produced by the adjustable nozzle.

When the tubing is in it contracted coiled configuration as illustrated in FIGS. 1 and 3A, it rests compactly for storage or positioning adjacent the hose faucet.

For use around the garden, it is a simple matter for the user to pick up the spray wand and to move away from the hose faucet 12. The configuration of the tubing manually and its coils is such that the user may easily extend the length of the tubing from its contracted length CL to any length between CL and its extended length EL. The form of the coils combines a wide range of extendibility with light weight for convenience of the user to move to selected portions of the garden remote from the faucet while still retaining attachment to the faucet for spray action. The elongate spray wand allows the user to reach regions that otherwise might be difficult to approach with prior devices. Further, by having tubing that is much smaller in diameter than a usual garden hose the total weight of the water-filled system is substantially reduced for easier handling by the user.

While a preferred embodiment of the invention as been described herein, it should be recognized that variations and modifications are possible without departing from the spirit of the invention.

What is claimed is:

1. A garden watering system comprising an elongate flexible tube formed in extendable and contractible helical coils having opposed ends, said tube being comprised of polyurethane having a durometer hardness measurement in a range of 85 to 98 Shore A, an inner diameter in a range of from 0.125 to 0.375 inch and an outer diameter in a range of 0.245 to 0.5625 inch, formed in coils having an inner diameter in a range of from 0.5 to 2.5 inches, the tube being so formed that adjacent coils when in a contracted position are pressed against each other, a faucet connector coupled to one end of the tube, and a spray nozzle coupled to the opposite end of the tube.

2. The system of claim 1, wherein said tube is comprised of polyurethane having a durometer hardness measurement in a range of 90 to 97 Shore A.

3. The system of claim 1, wherein said tube is comprised of polyurethane having a durometer hardness measurement of about 95 Shore A.

4. The system of claim 1, wherein said tube has an inner diameter in a range of from 0.150 to 0.250 inch and an outer diameter in a range of 0.245 to 0.375 inch.

5. The system of claim 1, wherein said tube has an inner diameter of about 0.160 inch and an outer diameter of about 0.245 inch.

6. The system of claim 1, wherein said tube is formed in coils having an inner diameter of about one inch.

7. The system of claim 1, wherein said tube has a selected contracted length and is manually extendable to a length at least 14 times said contracted length.

8. The system of claim 1, wherein said faucet connector comprises a fitting secured to an end of the tube and a screw-on coupling adapted to be attached to a faucet.

9. The system of claim 8, wherein said fitting comprises a barbed insert which is inserted and held by an interference fit in its associated end of the tube and has a bore extending therethrough of a defined diameter to provide a controlled flow of fluid therethrough to said tube.

10. The system of claim 9, wherein said screw-on coupling comprises an internally threaded hose coupling rotatably mounted on said fitting.

11. The system of claim 9, which further comprises a strain relief sleeve tightly surrounding said tube in the region of said insert and extending axially of said tube a distance beyond said insert.

12. The system of claim 1, wherein an elongate substantially rigid tube is interconnected between said flexible tube and said spray nozzle.

13. A garden watering system comprising an elongate flexible polyurethane tube having a durometer hardness measurement of about 95 formed in extendable and contractible helical coils of about one inch inner diameter, said tube having in inner diameter of about 0.160 inch and an outer diameter of about 0.245 inch and having opposed ends, a faucet connector coupled to one end of the tube comprising an insert fitting held by an interference fit in its associated end of the tube and an internally threaded coupling rotatably mounted on said fitting, and a spray nozzle coupled to the opposite end of the tube.

14. The system of claim 13, wherein the tube is so formed that adjacent coils when in a contracted condition are pressed against each other, the tube has a selected contracted length and is manually extendable to a length at least 14 times said contracted length.

15. A fluid delivery system comprising:

an elongate flexible polyurethane tube having a durometer hardness measurement of about 95 formed in extendable and contractible helical coils of about one inch inner diameter, said tube having an inner diameter of about 0.160 inch and an outer diameter of about 0.245 inch and having opposed ends, the tube being so formed that adjacent coils when in a contracted condition are pressed against each other, the tube has a selected contracted length and is manually extendable to a length at least 6 times said contracted length;

a connector coupled to one end of the tube for connecting the tube to a source of pressurized fluid;

a strain relief sleeve tightly surrounding said tube in the region of said connector and extending axially of said tube a distance beyond said connector, and a spray nozzle coupled to the opposite end of the tube.

* * * * *